(12) United States Patent
Pondelek

(10) Patent No.: US 10,404,132 B2
(45) Date of Patent: Sep. 3, 2019

(54) ELECTRIC MOTOR HAVING A CONTACT POINT ON A HOUSING FOR A GROUND CABLE

(71) Applicants: BROSE FAHRZEUGTEILE GMBH & CO. KOMMANDITGESELLSCHAFT, WÜRZBURG, Würzburg (DE); Martin Pondelek, Bergrheinfeld (DE)

(72) Inventor: Martin Pondelek, Bergrheinfeld (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 1066 days.

(21) Appl. No.: 14/382,456

(22) PCT Filed: Mar. 1, 2013

(86) PCT No.: PCT/EP2013/000602
§ 371 (c)(1),
(2) Date: Nov. 7, 2014

(87) PCT Pub. No.: WO2013/127535
PCT Pub. Date: Sep. 6, 2013

(65) Prior Publication Data
US 2015/0102693 A1 Apr. 16, 2015

(30) Foreign Application Priority Data
Mar. 1, 2012 (DE) .................. 10 2012 004 287

(51) Int. Cl.
*H02K 5/22* (2006.01)
*F16H 61/32* (2006.01)
(Continued)

(52) U.S. Cl.
CPC ............ *H02K 5/225* (2013.01); *F16H 61/32* (2013.01); *H02K 11/01* (2016.01); *H02K 11/33* (2016.01);
(Continued)

(58) Field of Classification Search
CPC .......... H01R 4/625; H01R 4/646; H01R 4/66; H01R 13/648; H01R 13/658; H01R 13/65802; H01R 24/66; H01R 24/70
(Continued)

(56) References Cited

U.S. PATENT DOCUMENTS 5,087,497 A 2/1992 Suzuki et al.
5,313,129 A * 5/1994 Stewart ............... H02K 5/1672
310/71
(Continued)

FOREIGN PATENT DOCUMENTS

DE 1613988 A1 10/1970
DE 19654352 A1 6/1998
(Continued)

*Primary Examiner* — Quyen P Leung
*Assistant Examiner* — Rashad H Johnson
(74) *Attorney, Agent, or Firm* — Laurence A. Greenberg; Werner H. Stemer; Ralph E. Locher

(57) ABSTRACT

An electric motor for an adjusting device of a motor vehicle, particularly of a gearbox actuator, has a stator energized by an electronic mechanism and a rotor for powering the motor. The stator is disposed in a metallic stator housing on which a contact point for connecting an earth cable is integrally shaped.

9 Claims, 2 Drawing Sheets

(51) Int. Cl.
  H02K 11/01 (2016.01)
  H02K 11/33 (2016.01)
  H02K 11/40 (2016.01)
  *H01R 24/66* (2011.01)
  *H01R 13/648* (2006.01)
  *H01R 24/70* (2011.01)
  *H01R 4/66* (2006.01)
  *H01R 4/64* (2006.01)
  *H01R 13/658* (2011.01)
  *H01R 4/62* (2006.01)

(52) U.S. Cl.
  CPC .............. H02K 11/40 (2016.01); *H01R 4/625* (2013.01); *H01R 4/646* (2013.01); *H01R 4/66* (2013.01); *H01R 13/648* (2013.01); *H01R 13/658* (2013.01); *H01R 24/66* (2013.01); *H01R 24/70* (2013.01)

(58) Field of Classification Search
  USPC ....... 310/71, 85, 89, 90; 439/92, 95, 97, 100
  See application file for complete search history.

(56) References Cited

U.S. PATENT DOCUMENTS

| | | | |
|---|---|---|---|
| 5,939,712 A | 8/1999 | Wetzel | |
| 6,262,509 B1 | 7/2001 | Safavi et al. | |
| 6,297,914 B1* | 10/2001 | Enomoto | G02B 15/161 359/692 |
| 6,358,022 B1 | 3/2002 | Frank et al. | |
| 7,375,287 B2 | 5/2008 | Rathmann | |
| 7,922,467 B2* | 4/2011 | Swanson | F04D 25/0606 310/68 R |
| 8,039,751 B2* | 10/2011 | Tsuboi | H02K 5/225 174/151 |
| 9,899,892 B2* | 2/2018 | Berkouk | H02K 5/225 |
| 2001/0017495 A1* | 8/2001 | Sato | H02K 5/15 310/67 R |
| 2010/0026116 A1* | 2/2010 | Eckert | H02K 5/225 310/71 |
| 2012/0031215 A1 | 2/2012 | Feier | |
| 2012/0068563 A1* | 3/2012 | Avula | H01R 9/226 310/71 |
| 2012/0330580 A1* | 12/2012 | Fruh | G01M 13/04 702/57 |
| 2014/0239758 A1* | 8/2014 | Nagao | H02K 5/225 310/71 |
| 2015/0084458 A1* | 3/2015 | Tokunaga | H02K 5/225 310/71 |
| 2015/0333596 A1* | 11/2015 | Berkouk | H05K 1/18 310/71 |
| 2016/0240964 A1* | 8/2016 | Clark | B64F 1/00 |

FOREIGN PATENT DOCUMENTS

| | | |
|---|---|---|
| DE | 19843021 C1 | 3/2000 |
| DE | 19858208 A1 | 6/2000 |
| DE | 10239512 A1 | 3/2004 |
| DE | 102007061011 A1 | 6/2009 |
| JP | S6022457 A | 2/1985 |
| WO | 2009077096 A1 | 6/2009 |
| WO | 2010108532 A2 | 9/2010 |

\* cited by examiner

ELECTRIC MOTOR HAVING A CONTACT POINT ON A HOUSING FOR A GROUND CABLE

BACKGROUND OF THE INVENTION

Field of the Invention

The invention relates to an electric motor of an adjusting device of a motor vehicle, in particular of a transmission actuator.

In the case of at least in part automated transmissions of a motor vehicle, the individual switching stages (gears) are set by means of a transmission actuator. For this purpose, the transmission actuator comprises a so-called shifting finger and an electric motor, wherein the shifting finger can be adjusted by the electric motor and wherein the position of the shifting finger determines the desired transmission ratio.

A brushless electric motor is generally used as the electric motor whose stator is supplied with an electric current by means of an electronic assembly. The electronic assembly comprises a number of semiconductor components that are interconnected in a bridge circuit. The bridge circuit is conventionally a B6 circuit and the stator comprises three field windings that are mutually interconnected either in a delta or star connection. The stator is arranged in a stator housing for the purpose of providing a shield and for avoiding possible damage to the field windings.

It is known from WO 2010/108532 A2 to fasten the electronic assembly to the stator housing by means of screws. The electronic assembly is thermally insulated from the stator housing in order to avoid an exchange of heat from the stator housing to the electronic assembly and to a cooling element that is arranged thereon. As a consequence, the electronic assembly is only in non-insulated contact with the stator and the stator housing by way of the screw and elements that are necessary for the purpose of controlling the field windings. In the case of a comparatively long operational life of the electric motor, it is possible for the screw to become detached or at least loosened from the stator housing as a result of vibrations of the electric motor. As a consequence, the contact between the electronic assembly and the stator housing is not provided or is not sufficiently provided.

BRIEF SUMMARY OF THE INVENTION

The object of the invention is to provide an improved and preferably comparatively safely operated electric motor in particular of a transmission actuator of a motor vehicle.

In accordance with the invention, the object with regard to the electric motor and with regard to the transmission actuator are achieved by the features of the independent claims. Advantageous embodiments and further developments are the subject matter of the dependent claims.

The electric motor drives an adjusting component of a motor vehicle and by way of example actuates a component part of an at least in part automated transmission. The electric motor comprises a stator that is supplied with an electric current by means of an electronic assembly. The stator comprises at least one, in particular three, field windings having in each case a coil body and two connection ends. The coil body is preferably embodied from a coated copper wire and is used to generate a magnetic field. This is provided by means of supplying an electric current to the coil by way of the connection ends. By way of example, the windings are mutually connected in a delta or star connection. The stator is arranged in a metal stator housing and, during the operation of the electric motor, heat that is produced within the field winding is dissipated to said stator housing.

The stator housing is preferably embodied from a stamped metal plate that is bent into shape and said stator housing comprises a cylindrical form. A contact point is formed on the stator housing and said contact point is embodied as one part with the housing. During the operation of the electric motor, a ground cable (also described as a ground line or ground connection) is in electrical contact with the contact point by means of which a static charge build-up on the stator housing is avoided. The ground cable is preferably electrically connected to the bodywork of the motor vehicle. As a consequence, an electrical charge transfer is rendered possible from the stator housing by way of the ground cable to the bodywork. It is preferred that in this case the electrical resistance of the ground cable is comparatively low.

As a result of avoiding static charge build-up on the stator housing, it is rendered possible to operate the electric motor in a comparatively safe manner since no static electrical field spreads between the electric motor and other components of the motor vehicle that surround the electric motor, such as for example the bodywork of the motor vehicle. Surrounding electronic components of the motor vehicle are therefore not influenced and as a result any negative impact on their effectiveness is avoided. Furthermore, an additional electromagnetic insulation of the electronic components is omitted which leads to savings with regard to both cost and weight of the motor vehicle. Furthermore, while disassembling the electric motor it is not necessary to pay any special attention to a possible static charge build-up on the electric motor. As a result of the contact point being embodied as one part with the stator housing, an electrical potential difference does not form between these components such as would occur while using two different materials or in the case of comparatively poor electrical contact between the two. In addition, said arrangement avoids corrosion at this location, any such corrosion would increase the electrical resistance between the contact point and the stator housing in a manner that is not advantageous. In addition, vibrations of the electric motor do not loosen the contact point from the stator housing.

The contact point is expediently at least in part stamped out of the stator housing, in other words from the housing casing or rather material and is embodied as a bent connection lug. In particular, a U-shaped contour is stamped out in the stator housing during its production. The resulting tongue is bent away in a further production step towards the exterior from the position of the stator within the stator housing. A comparatively simple and cost-effective embodiment of the contact point is achieved in this manner.

The contact point is suitably located on an end face of the cylinder-shaped stator housing. The term "end face" is understood to mean a base or rather covering surface of the cylindrical stator housing, wherein said surface is in particular round. As a result of this specific arrangement of the contact point, it is rendered possible to insert the electric motor into a previously existing holding device that surrounds the stator housing on its outer face. In particular, a non-positive locking connection or a positive locking connection between the holding device and the electric motor is not hindered by the contact point and for this reason the electric motor can be mounted in the motor vehicle in a comparatively time-saving, secure and cost-effective manner.

It is preferred that the stator housing comprises a connection unit by way of which the stator is controlled by means of the electronic assembly. The connection unit comprises for example a number of plugs that are in each case in electrical contact with a connection point of a field winding of the stator. The connection unit is located on the end face and the contact point of the ground cable is likewise arranged on said end face. As a consequence, contact with both the stator and also with the stator housing is only made on one end of the stator housing which facilitates its installation. It is only necessary for one end of the stator housing to be accessible for the purpose of assembling the respective electronic components. The stator housing therefore comprises comparatively compact dimensions.

The electronic assembly is suitably attached to the stator housing. In this manner, the electronic assembly can be mounted on the stator housing and also dismounted in a comparatively rapid manner. A comparatively cost-effective production process of the electric motor is rendered possible as a result of dividing the electric motor in to at least two parts, one part of said electric motor essentially comprising the mechanical components of the electric motor, namely the stator housing, and a further part comprising the electronic components of the electric motor, namely the electronic assembly. In addition, it is possible to produce the two parts independently of one another. By way of example, the electronic assembly is screwed to the stator housing. In this manner, the electronic assembly is connected to the stator housing in a comparatively secure manner, wherein this connection can be comparatively easily detached.

It is particularly preferred that both the connection unit and also the contact point are located on the end face of the stator housing, said end face lying opposite the end of the stator housing on which a shaft extension of the rotor protrudes out of the stator housing. The shaft extension is a component of a shaft of the rotor and is used for the purpose of mechanically coupling the rotor to a further component of the motor vehicle, such as for example a shifting finger of the transmission of the motor vehicle. This is preferably connected in a non-rotational manner to the shaft extension by means of screws or a press-fit. In this manner, a spatial separation of the mechanical and the electrical connections of the stator housing or rather of the rotor is provided with the respective further components of the motor vehicle which renders possible a simplified assembly of the electric motor both prior to installing said electric motor in the motor vehicle and also while installing said electric motor in the vehicle. In particular, the rotor of the electric motor is arranged within the stator of the electric motor. In other words, in the case of the electric motor, the rotor is an internal rotor. In this manner, the stator housing is accessible in a simplified manner and the rotor is comparatively effectively electrically shielded by means of the stator housing. As a consequence, an electromagnetic field is not produced between the rotor and further components of the motor vehicle thus avoiding impairing an operation of the electronic assembly that is installed in the motor vehicle.

The ground cable is integrated into the electronic assembly in an expedient manner. In particular, the contact connection contacts the ground cable while the connection unit contacts the electronic assembly. The electronic assembly is likewise suitably connected to ground by means of the ground cable. Furthermore, any existing cooling body of a power semiconductor switch of the electronic assembly is electrically connected to the ground cable. For this purpose, the electronic assembly expediently comprises a so-called star point that is guided to ground and from said star point in each case one ground cable leads to the cooling body, one ground cable leads to the electronic components of the electronic assembly and one ground cable leads to the stator housing. In this manner, potential differences that possibly occur between the individual components of the electric motor are avoided, said potential differences being capable of impairing the operation of the electric motor.

In an expedient manner, the ground cable is attached to the contact point. In other words, the ground cable at least in part surrounds the contact point in the mounted state and lies in particular in a positive-locking manner and/or a non-positive locking manner on said contact point. In particular, the connection is provided in the manner of a plug or insulation displacement clamp or by means of hook-shaped elements that engage in the ground cable and prevent the ground cable from detaching from the contact point. However, the kinematic reversal of the respective connection type would also likewise be feasible. A comparatively simple and time-saving type of assembly is rendered possible by means of mounting the ground cable on the contact point.

In one embodiment of the invention that is an alternative to this embodiment but can also be performed in combination therewith, the ground cable is soldered or welded to the contact point. In this manner, a gas-tight connection between the ground cable and the contact point is ensured. This prevents any possible corrosion between the ground cable and the contact point which leads to a constant electrical contact. In the case of a comparatively long operating life of the electric motor there is also consequently no potential difference between the stator housing and the ground cable. Likewise in the case of this type of connection, the contact is comparatively resistant to mechanical vibrations of the electric motor or of the ground cable.

The transmission actuator of the motor vehicle is used to select a specific transmission ratio of a transmission of the motor vehicle, wherein a main drive machine of the motor vehicle, in particular an internal combustion engine, is operatively connected to drive wheels of the motor vehicle by way of the transmission. By way of example, a so-called shifting finger is driven by at least one electric motor, by means of which the individual switching stages of the transmission are set. For example, the transmission actuator comprises two electric motors, wherein the switching movement is implemented by means of one of said electric motors and the movement for the purpose of selecting the so-called gear path is implemented by means of the other electric motor. In an expedient manner, it is possible by means of the electric motor to switch between a forwards movement and a rearwards movement of the motor vehicle. As an alternative or in combination therewith, a coupling is actuated by the electric motor.

The electric motor comprises a stator housing within which is arranged a stator. A contact point for the purpose of connecting a ground cable is formed as one part on the stator housing. As a result of the contact point being embodied as one part with the stator housing, a potential difference between the two is prevented. In addition, material corrosion also does not occur between the contact point and the stator housing as would be the case when using two different materials.

In addition, the electrical contact between the contact point and the stator housing is also provided during a comparatively long operational life and said contact could detach when using a further component, in particular said detachment occurs as a result of possible vibrations of the electric motor. This type of displacement of the contact point could alternatively lead to a build-up of an arc as a result of an electrical potential difference.

BRIEF DESCRIPTION OF THE SEVERAL VIEWS OF THE DRAWINGS

An exemplary embodiment of the invention is further explained hereinunder with reference to a drawing. In the drawings.

DESCRIPTION OF THE INVENTION

Figure 1:
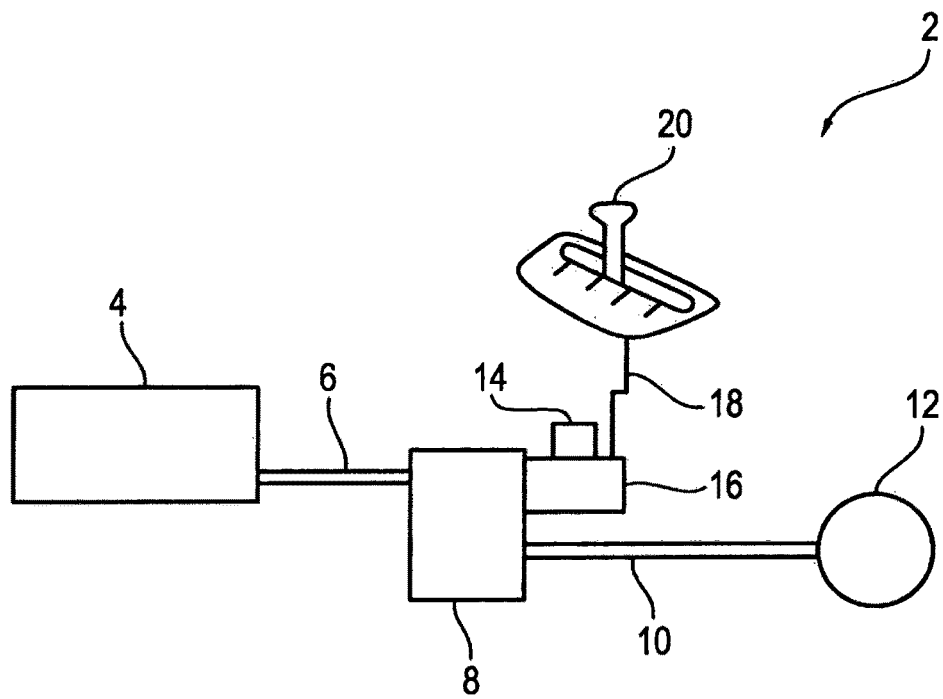
FIG. 1 illustrates schematically a simplified illustration of a powertrain of a motor vehicle.

Corresponding parts are provided with identical reference numerals in all figures.

FIG. 1 illustrates schematically a simplified illustration of a powertrain 2 of a motor vehicle. An internal combustion engine 4 is in operative contact with drive wheels 12 by way of a first shaft 6, a transmission 8, a second shaft 10 and a differential (not illustrated). The rotational movement of the first shaft 6 that is directly driven by the internal combustion engine 4 is converted into a rotational movement of the drive wheels 12, wherein both the direction of rotation and also the rotation speeds of the two differ. The rotational movement essentially occurs at a right angle with respect to rotational movement of the second shaft 10 as a result of the differential.

A specific transmission ratio between the first shaft 6 and the second shaft 10 is determined by means of the transmission 8. In addition, the direction of rotation of the second shaft 10 is set by means of the transmission 8. For this purpose, the transmission comprises a number of so-called switching stages that are selected by means of a transmission actuator 16 that comprises an electric motor 14. The electric motor 14 drives an adjusting part of the transmission actuator 16 that in turn is operatively connected to a selecting mechanism of the transmission 8. In addition, the transmission actuator 16 comprises an electronic control assembly (not illustrated) that controls the electric motor 14 and that is set by a selection lever 20 by way of a data line 18. The data line 18 is a CAN-bus and a driver can select the direction of movement of the motor vehicle by means of the selection lever 20.

Figure 2:
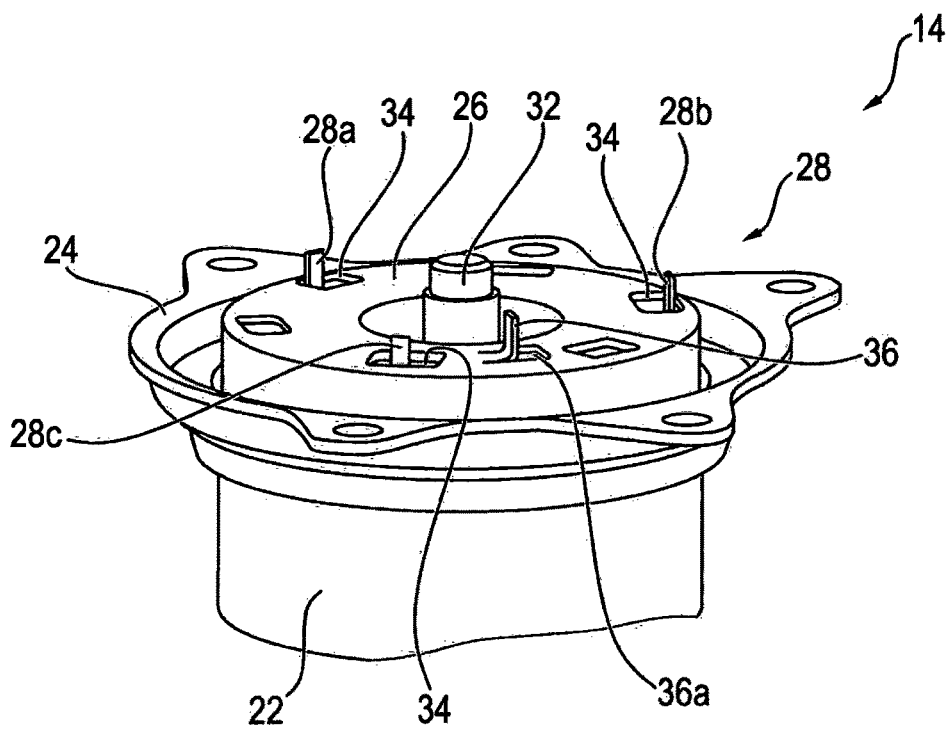
FIG. 2 illustrates the electric motor in perspective.

FIG. 2 illustrates in perspective a stator housing 22 of the electric motor 14. The stator housing 22 is stamped out of a metal and is bent into shape. The stator housing 22 comprises a cylindrical form having an essentially round base surface. The stator housing 22 is encompassed on the outer periphery by the mounting ring 24. In other words, the stator housing 22 is inserted into the mounting ring 24 and is held by the mounting ring in a positive locking or non-positive locking connection.

A connection unit 28 is located on an end face 26, also described as a bearing plate, of the cylinder shaped stator housing 22. The connection unit 28 comprises three connection points 28a, 28b, 28c that are electrically in electrical contact with field windings 29 of a stator 30 that is further illustrated in FIG. 4. A rotating magnetic field is generated by means of the field windings 29 and said magnetic field sets a rotor 32 that is likewise illustrated in FIG. 4 into a rotating movement. For this purpose, the field windings 29 are mutually connected in a so-called delta connection. The connection points 28a, 28b, 28c protrude through the openings 34 that are provided in the end face 26 of the stator housing 22. These rectangular-shaped openings 34 are stamped into the end face 26 during production of the stator housing 22. A U-shaped contour 36a is stamped into the end face 26 in the same production step. The resulting material tongue is bent towards the exterior in other words away from the interior of the stator housing 22 for the purpose of forming a bent connection lug and forms a contact point 36. The contact point 36 is consequently embodied as one part with the stator housing 22.

Figure 3:
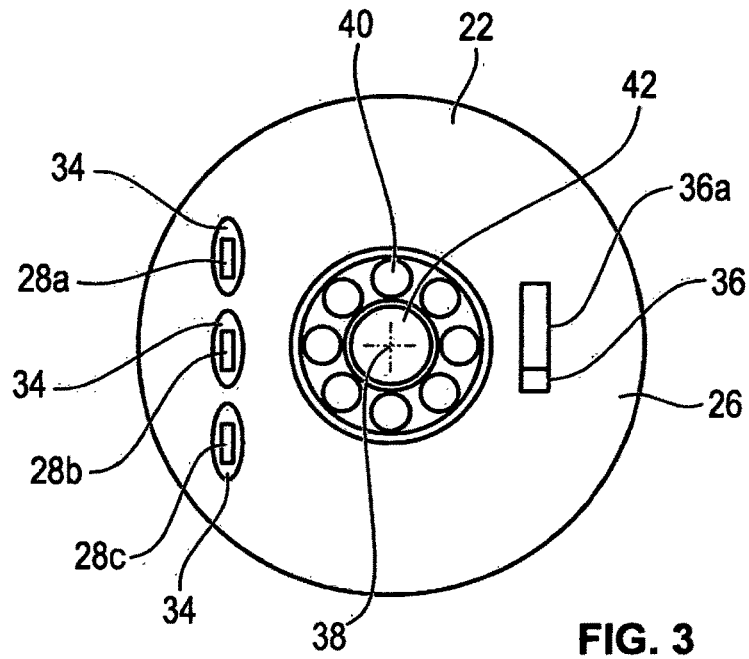
FIG. 3 illustrates schematically a simplified illustration of a stator housing of the electric motor in a plan view.
Figure 4:
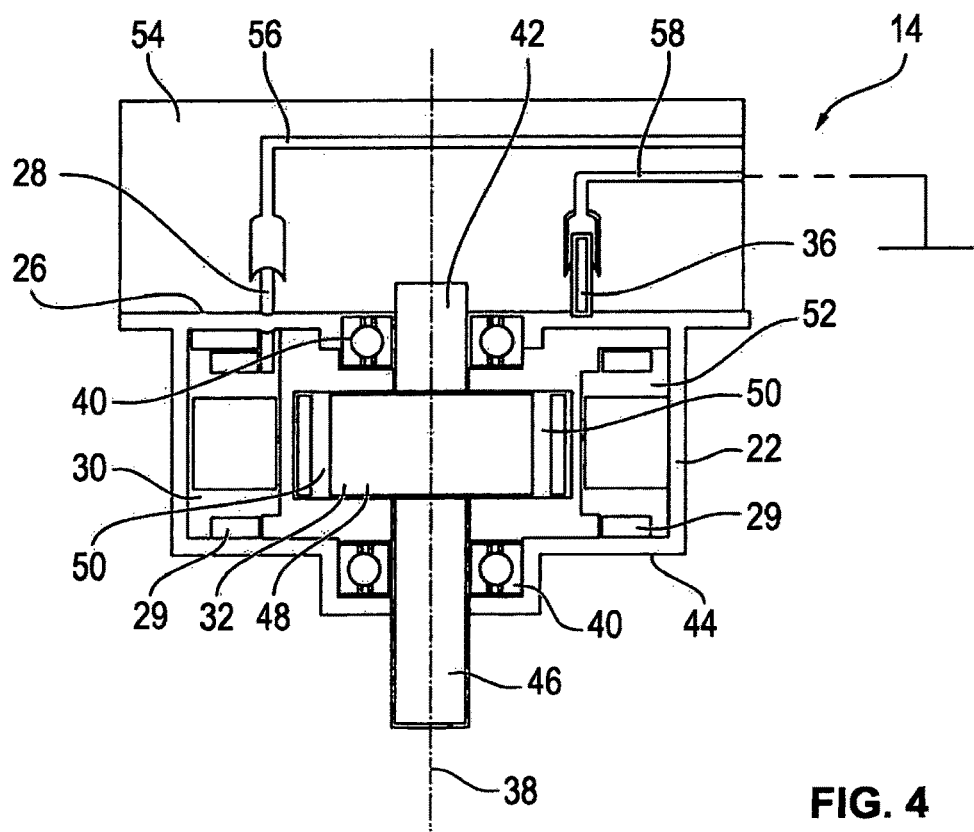
FIG. 4 illustrates the electric motor in a sectional view in accordance with FIG. 3.

The stator housing 22 and the electric motor 14 are illustrated schematically and in a simplified illustration in FIG. 3 and FIG. 4 in a plan view and a cross sectional view along the cylinder axis of the cylindrical stator housing 22, said cylinder axis coinciding with an axis of rotation 38 of the electric motor 14. The embodiment of the stator housing 22 differs in this case from that illustrated in FIG. 2. The three connection points 28a, 28b, 28c are located on one side of the axis of rotation 38 and are not distributed around this axis in a rotationally symmetrical manner. Two ball bearings 40 are pressed into the stator housing 22 within which a shaft 42 of the rotor 32 is mounted in a rotatable manner. One of the ball bearings 40 is arranged flush with the end face 26. The other ball bearing 40 is located in a specific contour that is integrated in the end face 44 of the stator housing 22, said end face lying opposite the end face 26. A shaft extension 46 protrudes on this end face 44 out of the stator housing 22. The shaft extension 46 describes the particular part of the shaft 42 to which is fastened the adjusting part of the motor vehicle, said adjusting part being driven by means of the electric motor 14.

A rotor laminated core 48 is fastened to the shaft 42 and said rotor laminated core receives a number of permanent magnets 50. A magnetic field is formed between said magnets and the stator 30 during the operation of the electric motor 14 and said magnetic field sets the rotor 32 in a rotational movement about the axis of rotation 38. For this purpose, the field windings 29 that are wound around the stator laminated core 52 are supplied with an electric current by way of the connection unit 28.

An electronic assembly 54 that in this case is only illustrated in part is attached to the end face 26 and is screwed into the stator housing 22. A number of conductor tracks 56 are integrated in the electronic assembly 54 and said conductor tracks supply the coil windings 29 with electrical energy by way of the respective connection points 28a, 28b, 28c. The electrical contact between the conductor rails 56 and the connection unit 28 is provided by means of soldering, clamping or a specifically produced stamped bent sheet part.

In addition, a ground cable is integrated in the electronic assembly 54, said ground cable being electrically connected to ground, in other words to the motor vehicle bodywork. The ground cable 58 is mounted on the contact point 36 and is soldered to said contact point. The stator housing 22 is therefore electrically connected to ground by way of the ground cable 58 which prevents a static charge build-up on the stator housing 22 during the operation of the electric motor. In addition, components of the electronic assembly 54 are in electrical contact with the ground cable 58, as a result of which an electrical field does not likewise form between the electronic assembly 54 and the stator housing. In the case of assembling the electronic assembly 54 on the stator housing 22, both the ground cable 58 and also the conductor rails 56 are electrically contacted by the contact point 36 or rather the connection unit 28 in one production step. In this manner, a comparatively rapid assembly of the electric motor is rendered possible.

The invention is not limited to the above described exemplary embodiment. On the contrary, other variants of the invention can also be derived therefrom by the person skilled in the art without departing from the subject matter of the invention. In particular, in addition, all the individual features that are described in relation to the exemplary embodiment can also be mutually combined in another manner without departing from the subject matter of the invention.

LIST OF REFERENCE NUMERALS

2 Powertrain
4 Internal Combustion Engine
6 First Shaft
8 Transmission
10 Second Shaft
12 Drive Wheels
14 Electric Motor
16 Transmission Actuator
18 Data Line
20 Selection Lever
22 Stator Housing
24 Mounting ring
26 End face
28 Connection Unit
28a Connection Point
28b Connection Point
28c Connection Point
29 Field Winding
30 Stator
32 Rotor
34 Opening
36 Contact Point
36a U-contour
38 Axis of Rotation
40 Ball Bearing
42 Shaft
44 End Face
46 Shaft Extension
48 Rotor Laminated Core
50 Magnet
52 Stator Laminated Core
54 Electronic Assembly
56 Conductor Tracks
58 Ground Cable

The invention claimed is:

1. An electric motor for an adjusting drive of a motor vehicle, the electric motor comprising:
a metal stator housing having an end face;
a ground cable;
a contact point connected to said ground cable and formed from said metal stator housing as an integrated one-piece part with said metal stator housing, said contact point is disposed on said end face of said metal stator housing and said contact point relative to an outer diameter of said metal stator housing is radially offset toward an inside;
a electronic assembly, said ground cable is integrated into said electronic assembly; and
a stator supplied with an electric current by said electronic assembly and disposed in said metal stator housing.

2. The electric motor according to claim 1, wherein said contact point is a bent connection lug that is stamped out of said metal stator housing.

3. The electric motor according to claim 1, wherein said end face has a connection unit for bringing said stator into contact with said electronic assembly.

4. The electric motor according to claim 3, wherein said electronic assembly is attached to said end face and is screwed to said end face.

5. The electric motor according to claim 1, further comprising a rotor having a single shaft extension disposed within said stator and said single shaft extension protruding out of a further end face of said metal stator housing that lies opposite said end face of said metal stator housing.

6. The electric motor according to claim 1, wherein said ground cable is mounted onto said contact point.

7. The electric motor according to claim 1, wherein said ground cable is one of soldered or welded to said contact point.

8. The electric motor according to claim 1, wherein said contact point is bent outward.

9. A transmission actuator of a motor vehicle, comprising:
a ground cable;
an electric motor containing a metal stator housing having an end face, a contact point connected to said ground cable formed from said metal stator housing as an integrated one-piece part with said metal stator housing, a electronic assembly, and a stator supplied with an electric current by said electronic assembly and disposed in said metal stator housing;
said contact point is disposed on said end face of said metal stator housing and said contact point relative to an outer diameter of said metal stator housing is radially offset toward an inside; and
said ground cable is integrated into said electronic assembly.

* * * * *